United States Patent [19]

Bae

[11] Patent Number: 5,573,087
[45] Date of Patent: Nov. 12, 1996

[54] CALIPER ASSEMBLY FOR A DISC BRAKE OF A VEHICLE

[75] Inventor: Gyu-Tae Bae, Kyungnam-do, Rep. of Korea

[73] Assignee: Hyundai Motor Company, Ltd., Seoul, Rep. of Korea

[21] Appl. No.: 580,647

[22] Filed: Dec. 29, 1995

[30] Foreign Application Priority Data

Oct. 29, 1994 [KR] Rep. of Korea .................. 94-28451

[51] Int. Cl.⁶ .................................................. F16D 65/38
[52] U.S. Cl. ........................ 188/73.39; 188/206 R; 188/73.37
[58] Field of Search ..................... 188/73.31, 73.35, 188/73.36, 73.37, 73.39, 205 R, 206 R, 205 A

[56] References Cited

U.S. PATENT DOCUMENTS

| 4,341,289 | 7/1982 | Smith ................. | 188/73.39 |
| 4,580,664 | 4/1986 | Kondo ................. | 188/73.39 |
| 4,915,198 | 4/1990 | Hirashita ............. | 188/73.39 |
| 5,060,766 | 10/1991 | Kondo ................. | 188/73.39 |

FOREIGN PATENT DOCUMENTS 50-141084  of 0000  Japan .

Primary Examiner—Robert J. Oberleitner
Assistant Examiner—Chris Schwartz
Attorney, Agent, or Firm—Birch, Stewart, Kolasch & Birch, LLP

[57] ABSTRACT

A caliper assembly for a disc brake of a vehicle, which assembly includes a carrier member, a disc, a pair of main pads attached to main pad plates forming a pad assembly, two pairs of pistons mounted to springs disposed within recesses which pass through the carrier member for pressing circumferential edges of the pad plates when the hydraulic fluid pressure supplied through hoses from the master cylinder compresses the springs and pistons, whereby since the pad plates are thus immobilized with respect to the carrier member, the caliper assembly reduces squeal noise due to non-vibration of the pad plate, and prevents the pads from non-uniformly abrading, thermotransforming, and changing properties thereof so as to highly increase braking efficiency.

4 Claims, 1 Drawing Sheet

(CONVENTIONAL CALIPER ARRANGEMENT)

CALIPER ASSEMBLY FOR A DISC BRAKE OF A VEHICLE

BACKGROUND OF THE INVENTION

1. Field of the Invention

The present invention relates to a caliper assembly for a disc brake of a vehicle and more particularly, to an improved caliper assembly including two pairs of operating rooms and a piston disposed within each operating room whereby hydraulic fluid pressure from a master cylinder presses the pistons, and the pistons press the peripheral edge surfaces of the pad plates so as to substantially eliminate noise and highly increase braking efficiency of the caliper assembly.

2. Description of Related Art

Various types of caliper assemblies are known in the art. Generally, a disc brake provides a braking function by pressing the disc with a pair of fluid pressurized pads. The disc brake has a number of advantages such as excellent heat radiation due to exposure thereof, and only a minimal loss of braking efficiency due to thermotransformation of the pads.

However, the caliper assembly for a disc brake does not prevent a squealing noise at the time of braking since a pad plate of a pad plate assembly is not tightly or permanently attached to the disc brake carrier, and therefore never successfully applies a powerful pushing force to the pads.

A conventional caliper assembly is described in Japanese Laid Open Utility Model Publication No. 50-141084, which includes a circular plate, a piston, a pad having a concave portion, and a pad plate having a convex portion slidably mounted to the concave portion of a pad for tightly contacting the pad to the pad plate. However, movement and thus noise or squealing will occur between the pad plate and the carrier, such that conventional caliper assemblies cannot reduce noise and cannot expect to improve a braking efficiency thereof.

As shown in FIG. 1, a conventional caliper assembly 50 includes a body 52 and a carrier member 66 slidably connected to the body 52 through a sliding bolt (not shown). The body 52 includes a cylinder 56, a piston 54 slidably disposed within the cylinder 56, and an annular seal 62 disposed around the circumference of the piston 54 for forming a seal between the interior wall of the cylinder 56 and the outer circumference of the piston 54.

A disc 64 is disposed between the carrier 66 and the piston 54 and is provided with a pair of right and left pads 60 and 61 disposed at opposing outer sides of the disc 64. Each pad 60 and 61 is fixed to a corresponding pad plate 58, 59. The pad plates 58, 59 are slidably retained on the carrier 66.

When fluid pressure operates to push the piston 54 in the cylinder 56 with fluid pressure from a master cylinder (not shown), the piston 54 moves to press the pad plate 58 and the right pad 60. At this time, the right pad 60 automatically presses the disc 64 and the left pad 61 simultaneously presses the disc 64 from the opposing side.

When the fluid pressure of the master cylinder is removed, the piston 54 returns to the original position and the pad plate 58 and right pad 60 separate from the disc 64 and the left pad 61 simultaneously separates from the disc 64.

However, such a conventional caliper assembly suffers from a number of problems. For example, the right and left pads 60 and 61 abrade unevenly since there is a space X between the piston 54 and the pad plate 58, therefore the pads 60 and 61 do not return to their original position. As a result, the pads 60 and 61 can be thermotransformed, thereby changing the properties thereof and potentially decreasing braking efficiency.

SUMMARY OF THE INVENTION

Accordingly, it is an object of the present invention to provide an improved caliper assembly for a disc brake of a vehicle, which eliminates the above problems encountered with conventional caliper assemblies.

Another object of the present invention is to provide a caliper assembly including two pairs of pistons for pressing peripheral edge surfaces of pad plates when hydraulic fluid pressure operates to push the pistons, the fluid pressure being delivered from a master cylinder through hoses which connect to passages through the carrier. Since the pad plate is tightly attached to the carrier at both ends thereof via the pairs of pistons, the caliper assembly eliminates noise and substantially increases braking efficiency.

A further object of the present invention is to provide a caliper assembly which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a caliper assembly for a disc brake of a vehicle, which assembly includes a carrier member, a disc provided with a pair of main pads attached to main pad plates, two pairs of pistons mounted to springs disposed within recesses of the carrier member for pressing the peripheral edge surfaces of the pad plates when the hydraulic fluid pressure supplied from the master cylinder through hoses compresses the springs and pistons, whereby since the pad plates become immobilized with respect to the carrier member, the caliper assembly reduces squeal noise by preventing vibration of the pad plate, and thereby preventing the pads from non-uniformly abrading, thermotransforming, and changing properties thereof so as to highly increase braking efficiency.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 2:
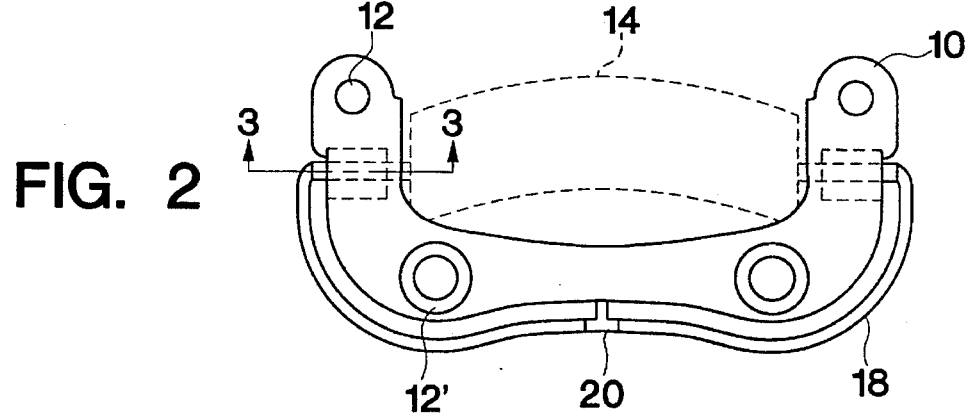
FIG. 2 is a partially diagrammatic side view of a caliper assembly showing fixing structure of a pad plate and a carrier member of the present invention.
Figure 3:
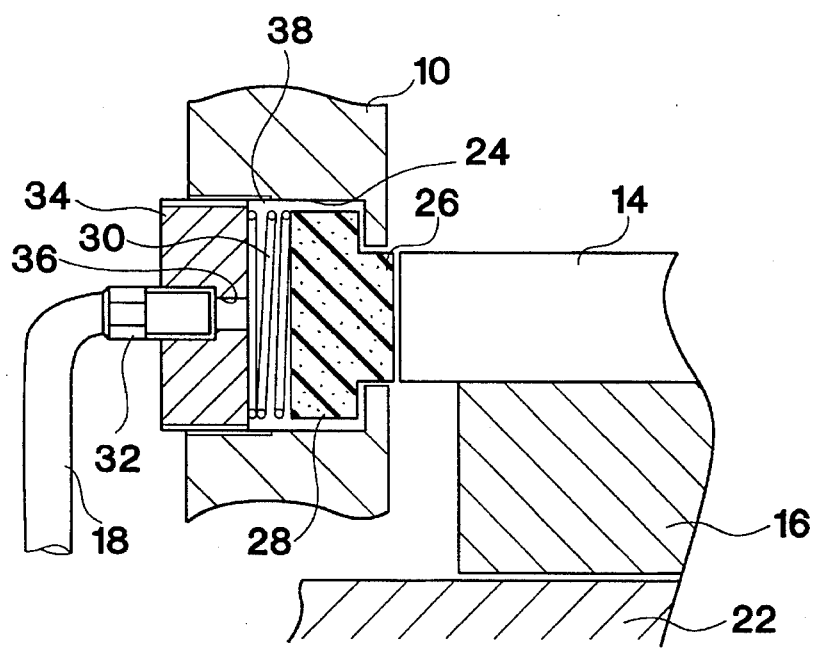
FIG. 3 is a sectional view, taken along line 3—3 of FIG. 2.

Referring now in detail to the drawings for the purpose of illustrating preferred embodiments of the present invention, the caliper assembly for a disc brake of a vehicle as shown in FIGS. 2 and 3, includes a pair of carrier members 10, each carrier member having a pair of upper apertures 12 and a pair of lower apertures 12', the apertures primarily receiving securement members for securing carrier members to each other and/or to a body portion of the disc brake assembly. A pair of pad plates 14 are positioned between the pair of carrier members 10 (FIG. 2). For ease of illustration, only a single one of the pair of carrier members 10 is shown, it being understood that the opposing one of the pair of carrier members is of like construction.

The carrier member 10 is provided with a pair of recesses 24 disposed in and through a wall thereof for forming respective operating chambers 38. Each operating chamber 38 includes a player nut 34 fixed to an opening thereof and a T-shaped piston 26 slidably disposed interior of the nut 34. A resilient member 30, such as a compressed spring, is disposed between the player nut 34 and the piston 26. The T-shaped piston has an annular seal 28 disposed therearound for fluidly sealing the piston 26 within the recess 24.

The player nut 34 contains a horizontal passage 36 fixed to a fluid pressure hose 18 through a nipple 32 at an outer end of the nut and operatively contacted to the resilient member 38 at an inner end of the nut. The fluid pressure hose 18 is connected to a master cylinder (not shown) for supplying fluid pressure into the operating chamber 38 by operation of a brake pedal (not shown). The pair of fluid pressure hoses 18 are attached to the carrier 10 by a pin 20 (FIG. 2). Each pad plate 14 includes a pad 16 attached thereto for operatively abrading a disc 22 (FIG. 3).

Figure 1:
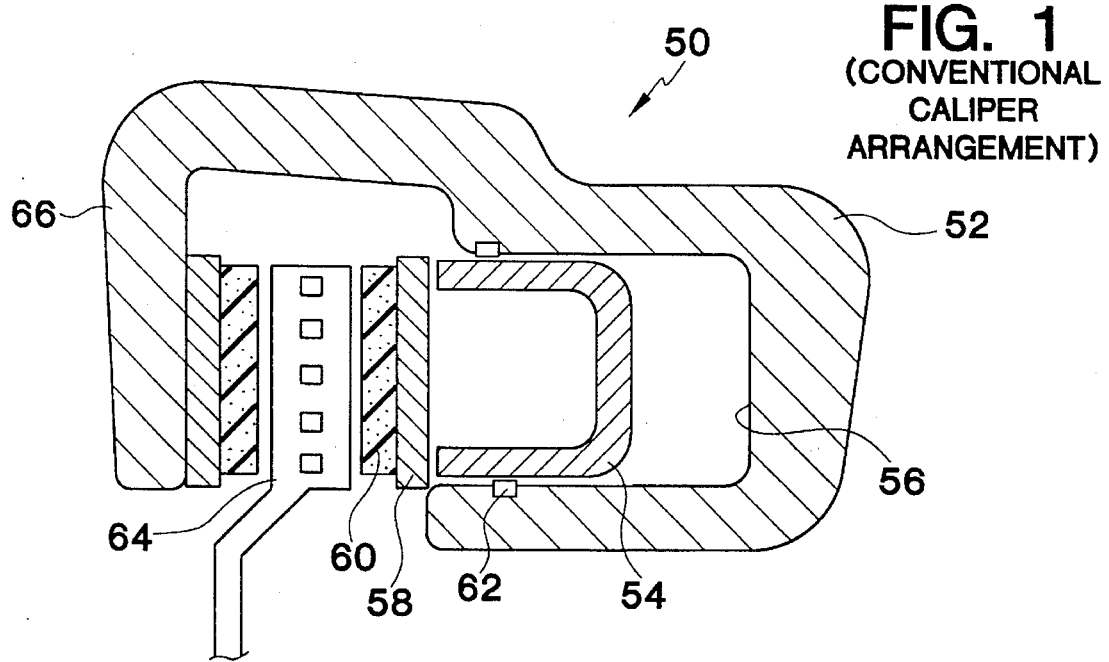
FIG. 1 is a sectional view of a conventional caliper assembly.

As shown in FIG. 1, the caliper assembly of the present invention also includes a conventional C-shaped body member 52, a cylindrical cavity 56 formed in the interior of the C-shaped body member 52, and a U-shaped carrier member 66 having a pair of symmetrical walls. The improvement of the present invention resides in the construction of the carrier portion thereof.

A main piston 54 is slidably disposed within the cylindrical cavity 56 of the body member 52, the main piston 54 having an annular main seal 62 disposed on outer circumferential surface thereof for forming a seal between the outer circumferential surface of the main piston 54 and an inner wall of the cylindrical cavity 56.

According to the instant invention, a pair of main pads 16 are attached to main pad plates 14 positioned on opposing sides of the disc 22, and the pair of main pads 16 are attached to main pad plates 14 disposed in the carrier member 10. Two pairs of recesses 24 are symmetrically disposed in the walls of each carrier member 10. The pistons 26 within each recess 24 act against the outer peripheral edge surface of the pad plate as shown in FIG. 3 so as to eliminate any bidirectional movement of the pad assembly resulting from a rotating force of the disc 22 against the planar face surfaces of the pads 16 fixedly mounted to the pad plates 14. Since the pad plate 14 can be held stationary with respect to the carrier member, no vibrational noise or squealing will occur.

The caliper assembly of the present invention operates as follows. When the master cylinder C (not shown) operates, the hydraulic fluid pressure presses the main piston 54 and the pressure of the hydraulic fluid forces the main piston 54 in the cylindrical cavity 56 to push the main pads 68 against the disc 22. Simultaneously, the hydraulic fluid pressure in the hose 18 starts to compress the resilient member 30 and the piston 26 in the recess 24 by the fluid pressure of the master cylinder of a vehicle (not shown). The piston 26 moves against and presses the peripheral surface edges of pad plate 14, thereby stabilizing the pad plate 14 with respect to the carrier member 10. At this time, the rotating disc 22 receives pad pressure and simultaneously applies a frictional rotation force against the pad 16 due to the rotation force of the disc. Since the pad plate 14 and pad 16 are secured together, the pad plate 14 presses against the piston 26 and the piston 26 pushes against the pad plate 14, so that the pad plate 14 tightly and effectively remains immobilized with respect to the wall of the carrier member 10.

Thus, since the pad plate 14 adheres closely and a stationary manner to the carrier member 10, the pad plate 14 does not vibrate and the caliper assembly of the present invention reduces squeal noise. Therefore, additional securement such as a clip need not be inserted between the carrier member 10 and the pad plate 14. There is also no need for a convex portion at the pad plate 14 and a concave portion at the pad 16 as utilized in conventional caliper assemblies. As a result, the caliper assembly of the present invention can highly increase braking efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A caliper assembly of a disc braking system for a vehicle, comprising:

a body member and a carrier member attached to said body member, said body member including a cylindrical cavity formed therein, and said carrier member having a U-shaped configuration and including a pair of symmetrical walls, a main piston slidably disposed within said cylindrical cavity of the body member, said main piston having an annular main seal disposed on an outer circumferential surface thereof for forming a seal between the outer circumferential surfaces of the piston and an inner wall of the cylinder, a disc positioned within said carrier, a pair of main pads attached to main pad plates positioned on opposing sides of said disc, said pair of main pads attached to main pad plates disposed in the lower portion of said carrier, two pairs of recesses disposed in the upper portion of said symmetrical walls and positioned on opposing sides of the carrier, each of said pairs of recesses including:

a player nut fixed to an outer portion thereof, a T-shaped piston slidably inserted within an inner portion thereof, a resilient member positioned between said player nut and said piston, an annular seal disposed on an outer circumferential surface of said piston, a fluid passage formed through said player nut, a pressure fluid hose connected to said fluid passage through a nipple, a pad plate having an outer peripheral edge surface operatively engageable with an operating portion of said piston, and a pad secured to said pad plate for applying friction to a side planar surface of said disc, whereby upon pressing a brake pedal, friction is applied to both side planar surfaces of the rotating disc by the main pads and simultaneously friction is applied to the circumferential edge surface of the spinning disc by two pairs of pistons, so that the caliper assembly effectively eliminates noise and highly increases braking efficiency.

2. The caliper assembly of claim 1, wherein said body member has a C-shaped configuration.

3. The caliper assembly of claim 1, wherein said resilient member is a compressed spring.

4. The caliper assembly of claim 1, wherein each of said pairs of recesses includes an operating chamber for housing the resilient member and piston.

* * * * *